US008205151B2

(12) United States Patent
Smith

(10) Patent No.: US 8,205,151 B2
(45) Date of Patent: Jun. 19, 2012

(54) SYNDICATION OF DOCUMENTS IN INCREMENTS

(75) Inventor: Michael H. Smith, Milton (AU)

(73) Assignee: Red Hat, Inc., Raleigh, NC (US)

( * ) Notice: Subject to any disclaimer, the term of this patent is extended or adjusted under 35 U.S.C. 154(b) by 979 days.

(21) Appl. No.: 11/809,628

(22) Filed: May 31, 2007

(65) Prior Publication Data

US 2008/0300864 A1    Dec. 4, 2008

(51) Int. Cl.
*G06F 17/00* (2006.01)
(52) U.S. Cl. ...................................................... 715/236
(58) Field of Classification Search .................. 715/236
See application file for complete search history.

(56) References Cited

U.S. PATENT DOCUMENTS

| | | | |
|---|---|---|---|
| 5,568,383 A | 10/1996 | Johnson et al. | |
| 5,664,183 A | 9/1997 | Cirulli et al. | |
| 5,848,386 A | 12/1998 | Motoyama | |
| 5,917,484 A | 6/1999 | Mullaney | |
| 5,987,402 A * | 11/1999 | Murata et al. | 704/2 |
| 6,002,396 A | 12/1999 | Davies | |
| 6,139,201 A * | 10/2000 | Carbonell et al. | 704/2 |
| 6,175,839 B1 | 1/2001 | Takao et al. | |
| 6,272,508 B1 | 8/2001 | Dyne et al. | |
| 6,411,314 B1 | 6/2002 | Hansen et al. | |
| 6,526,426 B1 | 2/2003 | Lakritz | |
| 6,589,291 B1 * | 7/2003 | Boag et al. | 715/235 |
| 6,598,015 B1 | 7/2003 | Peterson et al. | |
| 6,654,737 B1 | 11/2003 | Nunez | |
| 6,879,997 B1 * | 4/2005 | Ketola et al. | 709/208 |
| 7,139,696 B2 * | 11/2006 | Tokieda et al. | 704/8 |
| 7,356,458 B1 * | 4/2008 | Gonos | 704/8 |
| 7,512,532 B2 * | 3/2009 | Kimpara | 704/3 |
| 7,567,941 B2 | 7/2009 | Sagi et al. | |
| 7,580,960 B2 * | 8/2009 | Travieso et al. | 1/1 |
| 7,584,216 B2 * | 9/2009 | Travieso et al. | 1/1 |
| 7,627,817 B2 * | 12/2009 | Travieso et al. | 715/264 |
| 7,802,179 B2 * | 9/2010 | Bissonnette et al. | 715/229 |
| 2001/0029455 A1 | 10/2001 | Chin et al. | |
| 2001/0044868 A1 | 11/2001 | Roztocil et al. | |
| 2002/0049702 A1 * | 4/2002 | Aizikowitz et al. | 707/1 |
| 2002/0169842 A1 | 11/2002 | Christensen et al. | |
| 2003/0037076 A1 * | 2/2003 | Bravery et al. | 707/517 |
| 2004/0060005 A1 | 3/2004 | Vasey | |
| 2004/0125406 A1 | 7/2004 | McManus et al. | |
| 2004/0138872 A1 | 7/2004 | Nir | |
| 2004/0167784 A1 * | 8/2004 | Travieso et al. | 704/270.1 |
| 2005/0028080 A1 * | 2/2005 | Challenger et al. | 715/501.1 |

(Continued)

OTHER PUBLICATIONS

XSL Transformations, from Wikipedia. http://en.wikipedia.org/wiki/XSLT. Apr. 9, 2007. 7 pages.

(Continued)

*Primary Examiner* — Laurie Ries
*Assistant Examiner* — Mustafa Amin
(74) *Attorney, Agent, or Firm* — Lowenstein Sandler PC

(57) ABSTRACT

Some embodiments of a publishing tool to provide syndication in increments have been presented. In one embodiment, a set of documents in different formats and/or different natural languages has been generated from a master document. In response to a change in the master document, a corresponding part in each of the plurality of documents is synchronously generated without regenerating an entirety of each of the plurality of documents. Then each of the set of documents is updated using the corresponding part generated.

22 Claims, 5 Drawing Sheets

U.S. PATENT DOCUMENTS

| | | | |
|---|---|---|---|
| 2005/0060648 A1* | 3/2005 | Fennelly et al. | 715/523 |
| 2005/0131768 A1 | 6/2005 | Rodriguez et al. | |
| 2005/0132284 A1* | 6/2005 | Lloyd et al. | 715/517 |
| 2005/0185930 A1* | 8/2005 | Jung et al. | 386/95 |
| 2005/0240905 A1* | 10/2005 | Pournasseh et al. | 717/136 |
| 2006/0015763 A1* | 1/2006 | Nakajima | 714/4 |
| 2006/0036612 A1 | 2/2006 | Harrop et al. | |
| 2006/0064631 A1 | 3/2006 | Parker | |
| 2006/0136387 A1* | 6/2006 | Yalovsky et al. | 707/3 |
| 2006/0136510 A1* | 6/2006 | Voronov et al. | 707/203 |
| 2006/0136824 A1 | 6/2006 | Lin | |
| 2006/0200766 A1 | 9/2006 | Lakritz | |
| 2006/0294418 A1* | 12/2006 | Fuchs | 714/11 |
| 2007/0156744 A1* | 7/2007 | Harrington | 707/102 |
| 2007/0180359 A1 | 8/2007 | Giannetti | |
| 2007/0192685 A1* | 8/2007 | Morales et al. | 715/515 |
| 2007/0230750 A1 | 10/2007 | Ikeda et al. | |
| 2008/0040397 A1* | 2/2008 | Herbeck et al. | 707/201 |
| 2008/0082317 A1 | 4/2008 | Rosart et al. | |
| 2008/0155390 A1* | 6/2008 | Karim et al. | 715/208 |
| 2008/0172637 A1 | 7/2008 | Chang et al. | |
| 2008/0235569 A1* | 9/2008 | Arun et al. | 715/229 |
| 2008/0281804 A1 | 11/2008 | Zhao et al. | |
| 2009/0125497 A1* | 5/2009 | Jiang et al. | 707/4 |
| 2009/0171961 A1* | 7/2009 | Fredrickson | 707/7 |

OTHER PUBLICATIONS

FOP (Formatting Objects Processor) rom Wikipedia. http://en.wikipedia.org/wiki/FOP. Apr. 9, 2007. 2 pages.

Stylesheet Language, from Wikipedia. http://en.wikipedia.org/wiki/Stylesheets. Apr. 2, 2007. 2 pages.

DocBook, from Wikipedia. http://en.wikipedia.org/wiki/DocBook. Apr. 2, 2007. 4 pages.

DocBook, The Definitive Guide. The Official Documentation for DocBook by O'Reilly. Copywrited 1999. 123 pages.

Senellart, Pierre, et al., "Systran Translation Stylesheets: Machine Translation driven by XSLT", Published 2005 by RenderX, pp. 1-15.

Office Action mailed May 26, 2010 for U.S. Appl. No. 11/809,462, filed May 31, 2007, 25 pages.

Office Action mailed Apr. 1, 2010 for U.S. Appl. No. 11/809,467, filed May 31, 2007, 12 pages.

Wikipedia, "DocBook", accessed at http://en.wikipedia.org/w/index.php?title=DocBook&oldid=132582366, modified on May 22, 2007, 4 pages.

USPTO, Final Office Action for U.S. Appl. No. 11/809,467, mailed Aug. 18, 2010, 11 pages.

USPTO, Final Office Action for U.S. Appl. No. 11/809,462, mailed Oct. 13, 2010, 28 pages.

* cited by examiner

SYNDICATION OF DOCUMENTS IN INCREMENTS

TECHNICAL FIELD

Embodiments of the present invention relate to publishing documents, and more specifically to syndication of documents in increments.

BACKGROUND

Today, many documents are often published via different media or channels (e.g., in print, online, etc.), where some are published in different natural languages (e.g., English, French, German, etc.). A document that is published in different formats and/or in different natural languages is hereinafter referred to as a master document. For example, a master document may be a user manual of a product (e.g., a computer, a piece of software, etc.) marketed in many countries. Thus, the user manual needs to be published in the languages of these countries. Further, the user manual in each of the above languages may be published in print, where a hardcopy of the user manual is packaged with the product, while the user manual is also published electronically on a customer support webpage hosted by the manufacturer of the product. When the user manual has to be updated or revised, one or more persons have to manually translate the changes into each of the supported natural language and then manually edit the corresponding version accordingly in order to publish the revised user manual.

A natural language as used herein generally refers to a language written or spoken by humans for general-purpose communication, as opposed to constructs, such as computer-programming languages, machine-readable or machine-executable languages, or the languages used in the study of formal logic, such as mathematical logic. Some examples of a natural language include English, German, French, Russian, Japanese, Chinese, etc. Although conventional translation software tools are available to translate a master document from a first natural language into a second natural language (e.g., from English to French), each of these conventional translation software tools typically supports two natural languages only. That is, one has to use another conventional translation software tool to translate the same master document from the first natural language into a third natural language (e.g., from English to German). Further, when the master document is revised, each of the conventional translation software tools typically goes through the entire master document again to repeat the translation process in order to propagate the changes in the revised master document to the translated documents, regardless of the scope of the change made in the master document. Thus, for a relatively small change in the English document, a disproportionate amount of time has to be spent to regenerate the translations of the document.

Likewise, to propagate the change to other electronic versions of the document in different formats, one has to regenerate the entire document in each supported format. For example, using one conventional publishing tool, DocBook, a user may run a script on the entire master document, which has been updated, to regenerate the entire document in different formats supported (e.g., Hypertext Markup Language (HTTP) format, Portable Document Format (PDF), etc.). However, DocBook typically processes the entire master document again to generate output documents in different formats, regardless of the scope of the change made in the master document. Thus, for a relatively small change in the master document, a disproportionate amount of time has to be spent on regenerating output documents in the supported formats.

DESCRIPTION OF THE DRAWINGS

The present invention is illustrated by way of example, and not by way of limitation, in the figures of the accompanying drawings and in which.

DETAILED DESCRIPTION

Figure 1A:
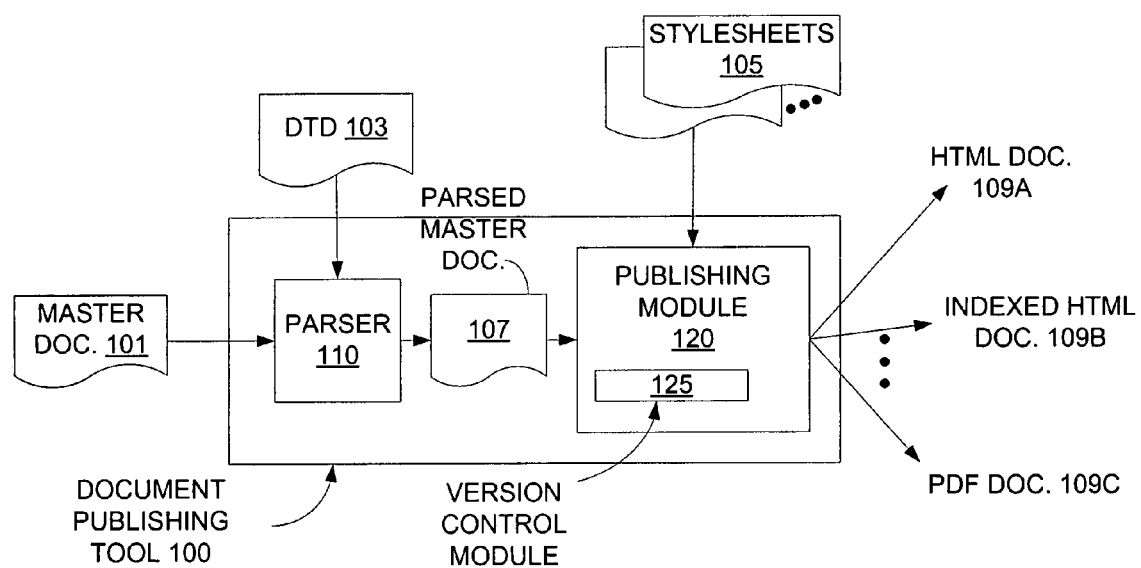
FIG. 1A illustrates one embodiment of a document publishing tool.

Described herein are some embodiments of a document publishing tool to syndicate documents in increments. In one embodiment, a set of documents in different formats and/or different natural languages has been generated from a master document. In response to a change in the master document, a corresponding part in each document of the set is synchronously generated without regenerating an entirety of each of the documents. Then each of the set of documents is updated using the corresponding part generated. Using the above approach, the set of documents are dynamically maintained because the documents are updated whenever the master document is changed. Details of some embodiments of the publishing tool are described below. Before going into the details of some embodiments of the publishing tool, some of the terms used in the current description are defined below.

A document as used herein broadly refers to a piece of literary work, which may be written in a specific natural language (e.g., English, French, etc.). Some examples of a document include a novel, a news report, a product manual, a specification, etc. The document may be encoded in a predetermined format using a markup language, such as, hypertext markup language (HTML), extensible markup language (XML), etc.

Further, publishing a document generally refers to making the document available for a group of people to access, such as subscribers of a particular service, purchasers of a product, attendees of a conference, general public, etc. Publishing a document in different formats, in one or more natural languages, and/or via multiple media substantially simultaneously is referred to as syndication of the document. For example, a document may be syndicated by publishing the document in print and over a network (a.k.a. online) substantially simultaneously.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, compact disc read-only memories (CD-ROMs), and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Document Publishing Tool

FIG. 1A illustrates one embodiment of a document publishing tool. The document publishing tool 100 includes a parser 110 and a publishing module 120 functionally coupled to each other. The document publishing tool 100 receives an input document, hereinafter referred to as a master document 101. The master document 101 is written in a markup language compliant to Standard Generalized Markup Language (SGML), such as Extensible Markup Language (XML), etc. In general, the markup language provides a set of tags to allow an author to mark up the structure and/or semantic content of the master document 101 without dictating the specific appearance of an output generated from the master document 101. In other words, the presentation and the content of the master document 101 are separated such that the author of the master document 101 does not have to specify or describe the presentation of the master document 101 while composing the content of the master document 101.

In some embodiments, the master document 101 is input into the parser 110. The parser 110 parses the master document 101 using elements from a Document Type Definition file (DTD) 103. An element is a term that describes a document's content and/or structure. The DTD 103 includes a set of elements defined for the markup language in which the master document 101 is written. In addition, the DTD 103 describes the way the elements and the corresponding contents should be written in the master document, such as the order of the elements. The parser 110 reads the DTD 103 and the master document 101, parses the master document 101, and determines whether the way the master document 101 is written is valid according to the DTD 103. If the master document 101 is written in an invalid way, the parser 110 outputs one or more error messages on the errors found in the master document 101 during parsing. Otherwise, the parser 110 forwards the parsed master document 107 to the publishing module 120.

The publishing module 120 publishes the master document 101 in multiple different formats according to the stylesheets 105 input to the publishing module 120. As mentioned above, publishing a document generally refers to making the document available for a group of people to access. The formats in which the master document 101 is published may include in print (e.g., on paper, in Braille, embodied in a physical machine readable medium, etc.) or over a network (also commonly referred to as "online"), such as an intranet, the Internet, etc. Each of the stylesheets 105 describes or specifies the presentation of structured documents according to one of the supported formats.

In some embodiments, each of the stylesheets 105 is written in a stylesheet language, such as Document Style Semantics and Specification Language (DSSSL), Cascading Style Sheets (CSS), Extensible Style Language (XSL), Extensible Stylesheet Language Transformations (XSLT), etc. For each output document format, there is at least one stylesheet specifying the corresponding details, such as the font type and size for a heading of a chapter, the output file type (e.g., HTML, PDF, etc.). Based on the specification on the stylesheet, the master document 101 may be formatted into a predetermined style. However, the formatting does not change the master document 101. Instead, an output document is created to contain the formatted document. Some examples of the output documents are illustrated in FIG. 1A, including an output document in HTML format 109A, an output document in an indexed HTML format 109B, and an output document in PDF format 109C. Further, the stylesheets 105 may include stylesheets that support different natural languages (e.g., English, French, German, Spanish, etc.). As such, the publishing module 120 may translate the master document 101 into different natural languages using the corresponding ones of the stylesheets 105.

When a change is made in the master document 101 in response to a user request, the publishing module 120 may syndicate the master document 101 in increments by applying the stylesheets 105 to one or more parts of the master document 101 affected by the change to re-generate the corresponding parts of the output documents. Note that a master document is divided into multiple parts according to its structure and/or semantics, marked up using tags of a markup language in which the master document 101 is written. For instance, a master document may be divided into a number of chapters, where each chapter is further divided into a number of sections. When there is a change in the master document, the specific part (e.g., section one of chapter two of the master document 101) is identified using the tags. Then the publishing module 120 applies the stylesheets 105 to the specific part to generate the corresponding parts in the output documents. The corresponding existing parts in the output documents are replaced with the newly generated parts in order to update the output documents. For instance, the specific part may be translated into each of the supported natural languages to generate a set of output parts, each output part in a distinct one of the supported natural languages. To update the existing output documents, each of the output parts replaces the corresponding part in the respective existing output document.

By re-generating only the affected parts of the output documents in response to a change in the master document 101, the document publishing tool 100 provides dynamic and synchronous updates to the output documents. As such, the document publishing tool 100 may syndicate the master document 101 in increments. Moreover, the document publishing tool 100 does not have to repeat processing of the entire master document 101 every time there is a change in the master document 101, which significantly saves processing time if the size of the master document 101 is relatively large.

In some embodiments, the document publishing tool 100 further includes a version control module 125 to provide version control to the master document 101. The version control module 125 may be part of the publishing module 120. Alternatively, the version control module 125 may be a separate module operatively coupled to the publishing module 120. The version control module 125 may assign a unique version number to a copy of the master document 101 and the corresponding output documents each time the master document 101 is changed. The version control module 125 may further store the changes made to the master document and the output documents with the corresponding version numbers. In some embodiments, each of the output documents may include a corresponding version number. When the publishing module 120 updates the output documents in response to a change in the master document 101, the version control module 125 may replace the existing version number in each of the output documents with a new version number. As such, the version control module 125 automatically keeps track of the versions of the output documents. The above approach automates version control in the syndication of the master document 101.

System Architecture

Figure 1B:
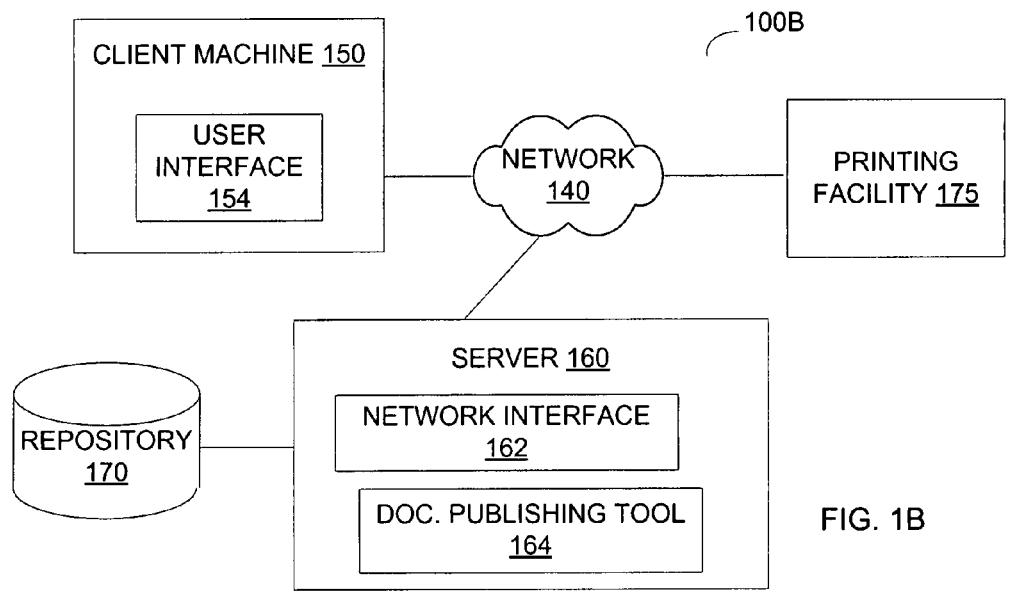
FIGS. 1B and 1C illustrate some embodiments of an architecture of a publishing system in which embodiments of the present invention may be implemented.

FIG. 1B illustrates one embodiment of a system in which embodiments of the present invention may be implemented. The system 100B includes a client machine 150, a network 140, a printing facility 175, a server 160, and a repository 170. Some examples of the client machine 150 include a desktop personal computer (PC), a laptop PC, a personal digital assistant (PDA), a cellular telephone or mobile telephone, etc. The client machine 150 includes a user interface module 154. The server 160 includes a network interface 162 and a document publishing module 164. The server 160 is communicatively coupled to the client machine 150 via the network 140. The server 160 may be further coupled to the repository 170, such as a lightweight directory access protocol (LDAP) repository. The network 140 may include various kinds of networks, such as a local area network (LAN), a wide area network (WAN), a wireless network, a wired network, etc.

Note that any or all of the components and the associated hardware illustrated in FIG. 1B may be used in various embodiments of the system 100B. However, it should be appreciated that other configurations of the system 100B may include more or fewer devices than those shown in FIG. 1B.

In some embodiments, the user interface module 154 in the client machine 150 receives a master document. The client machine 150 sends the master document to the server 160 via the network 140. The server 160 receives the master document via the network interface 162. On the server 160, the document publishing tool 164 processes the master document as described above to generate a set of output documents in one or more predetermined formats. The server 160 may store the master document and the output documents in the repository 170. In some embodiments, the document publishing tool 164 further stores changes made to the master document and the output documents in the repository 170. Further, the server 160 may import a set of stylesheets from the repository 170. In some embodiments, the document publishing tool 164 sends one of the output documents to the printing facility 175 to be published in print, such as printing hardcopies of the output documents, embodying the output documents into machine-readable storage media (e.g., CD-ROMs, etc.), etc. Later, a user may change the master document or request to change the master document via the user interface 154. The request and/or the change in the master document may be sent from the client machine 150 to the server 160 via the network 140. The server 160 receives the request and/or the change in the master document via the network interface 162. In response to the request or the change in the master document, the document publishing tool 164 may update the output documents as discussed above in detail.

Figure 1C:
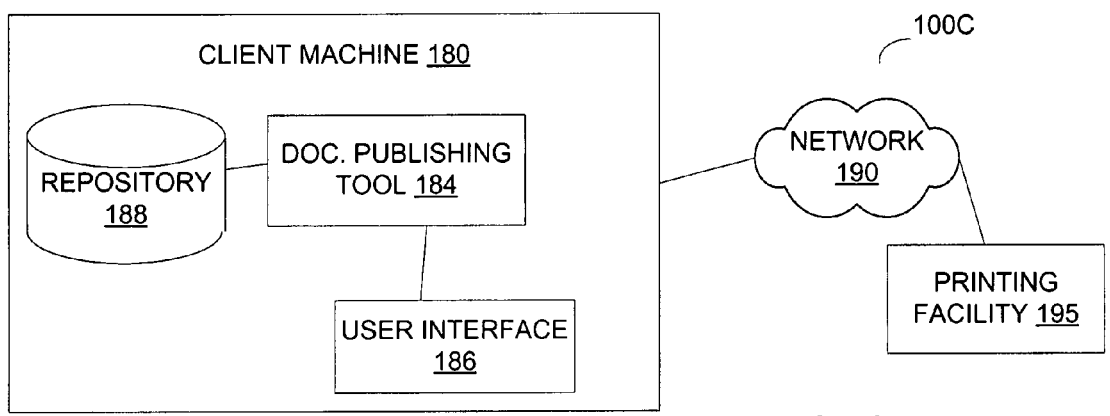

FIG. 1C illustrates another embodiment of a system in which embodiments of the present invention may be implemented. The system 100C includes a client machine 180, a printing facility 195, and a network 190. Some examples of the client machine 180 include a desktop PC, a laptop PC, a PDA, a cellular telephone or mobile telephone, etc. The client machine 180 includes a user interface module 186, a repository 188, and a document publishing tool 184. The repository 188 may include a LDAP repository. The client machine 180 is communicatively coupled to the network 190. The network 190 may include various kinds of networks, such as a LAN, a WAN, wireless network, wired network, etc. Via the network 190, the client machine 180 is communicatively coupled to the printing facility 195.

Note that any or all of the components and the associated hardware illustrated in FIG. 1C may be used in various embodiments of the system 100C. However, it should be appreciated that other configurations of the system 100C may include more or fewer devices than those shown in FIG. 1C.

In some embodiments, the user interface module 186 in the client machine 180 receives a master document. The document publishing tool 184 processes the master document as described above to generate a set of output documents in one or more predetermined formats. The master document and the output documents may be stored in the repository 188. In some embodiments, the document publishing tool 184 further stores changes made to the master document and the output documents in the repository 188. The repository 188 may further store a set of stylesheets used by the document publishing tool 184 to generate the output documents. In some embodiments, the document publishing tool 184 sends one of the output documents to the printing facility 195 to be published in prints, such as printing hardcopies of the output documents, embodying the output documents into machine-readable storage media (e.g., CD-ROMs, etc.), etc. Later, a user may change the master document or request to change the master document via the user interface 186. In response to the request or the change, the document publishing tool 184 may update the output documents as discussed above in detail.

Document Publishing Flow

Figure 2:
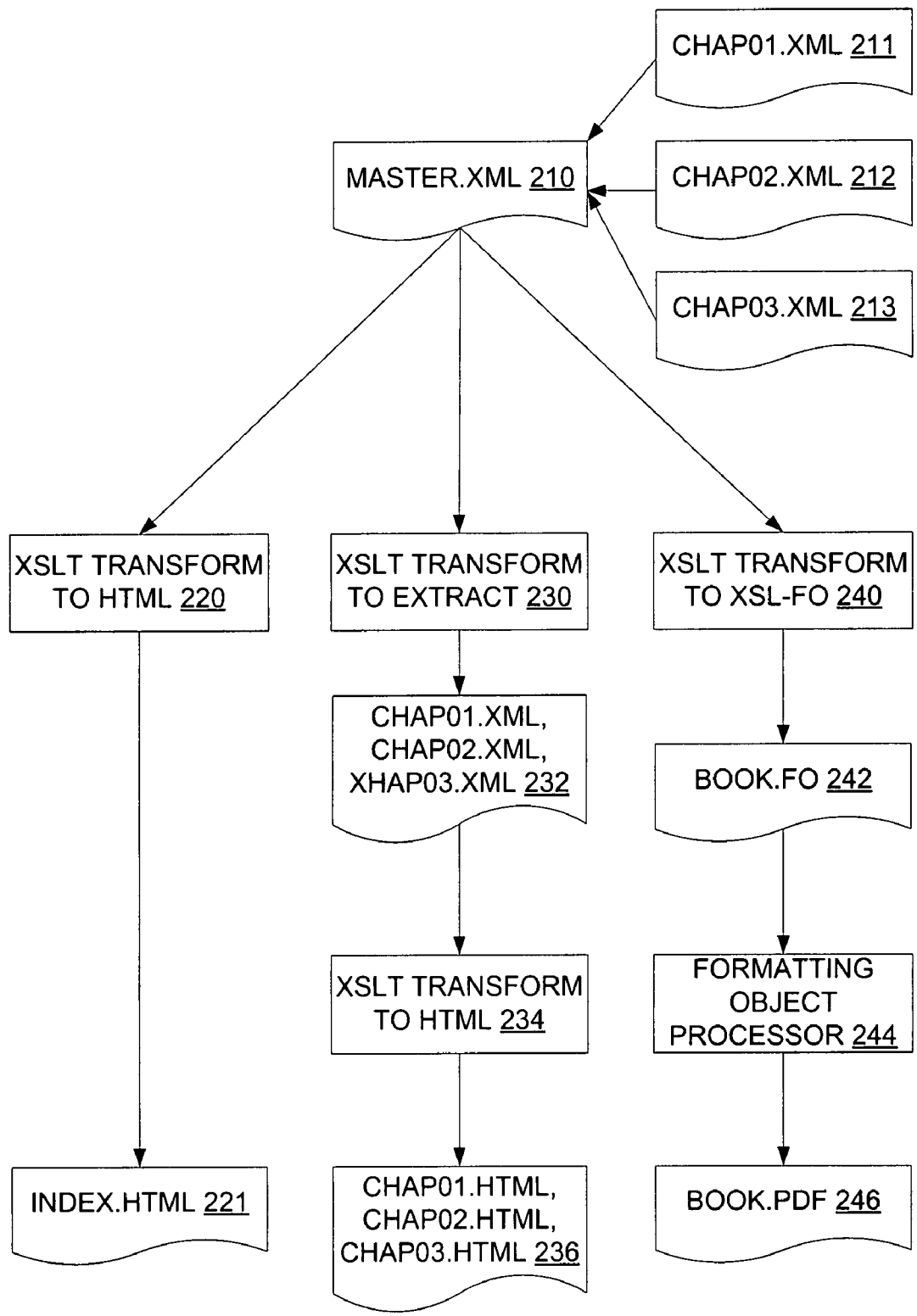
FIG. 2 illustrates one embodiment of a document publishing flow.

FIG. 2 illustrates one embodiment of a document publishing flow. A master document 210 composes of three chapters 211-213. The master document 210 and the three chapters 211-213 may be written in XML, where the master document 210 includes references to the XML files containing the three chapters (i.e., chap01.xml 211, chap02.xml 212, and chap03.xml 213).

In one embodiment, a first stylesheet written in XSLT is applied onto the master document 210 in block 220 to generate an output document in HTML, namely, index.html 221. The output document, index.html 221, is a single output document written in HTML.

In another embodiment, a second stylesheet written in XSLT is applied onto the master document 210 in block 230 to extract the three chapters (i.e., chap01.xml, chap02.xml, and chap03.xml) 232 from the master document 210. Then a third stylesheet written in XSLT is applied onto the three chapters 232 in block 234 to generate the corresponding HTML chapters 236, i.e., chap01.html, chap02.html, and chap03.html.

In another embodiment, a fourth stylesheet written in XSLT is applied onto the master document 210 in block 240 to generate a formatting object (FO) copy of the master document 210, i.e., book.fo 242. Then book.fo 242 is input to a formatting objects processor (FOP) 244, which converts book.fo 242 into PDF format (i.e., book.pdf 246). Alternatively, the FOP 244 may convert book.fo 242 into other formats, such as PostScript, or a format suitable for direct printer output.

Figure 3:
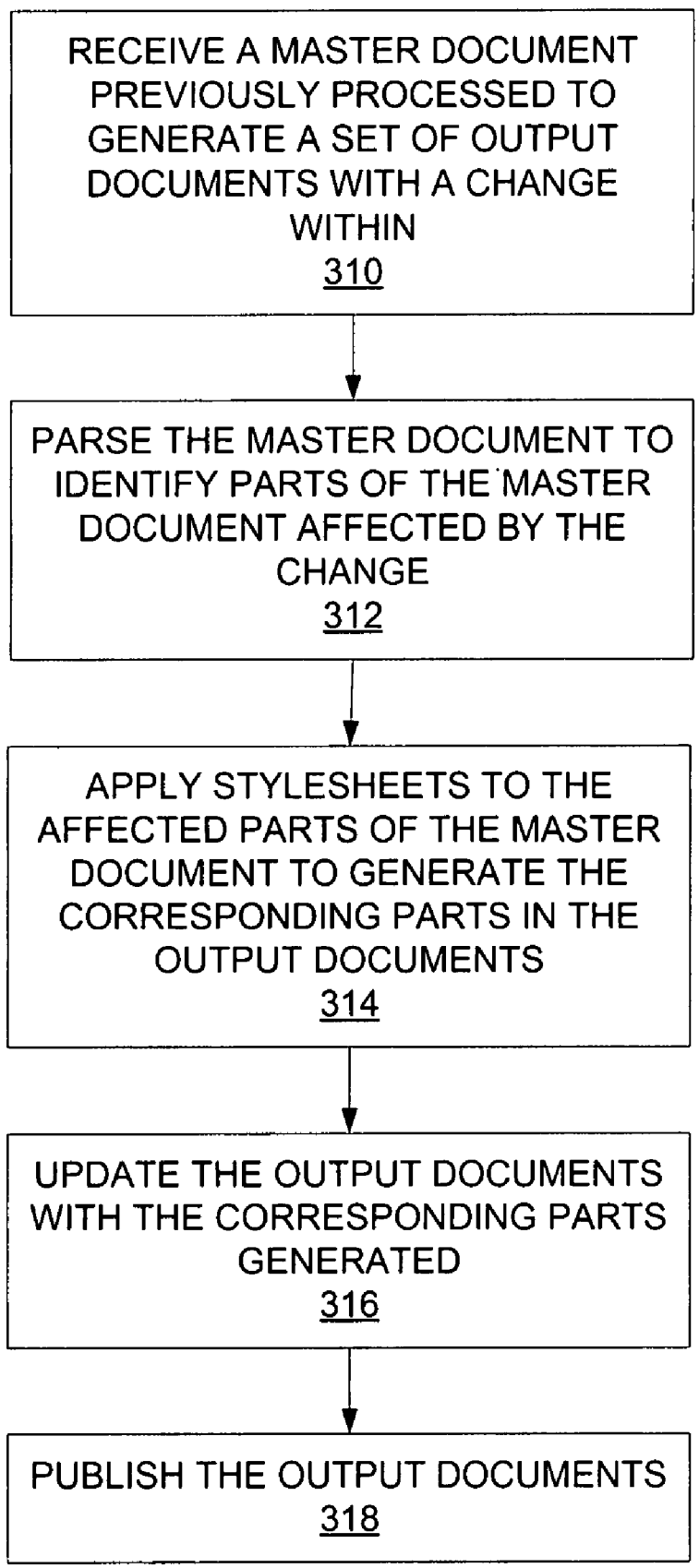
FIG. 3 illustrates one embodiment of a process to syndicate a document in increments.

FIG. 3 illustrates the flow diagram of one embodiment of a process to update output documents generated from a master document. The process may be performed by processing logic that may comprise hardware (e.g., circuitry, dedicated logic, programmable logic, microcode, etc.), software (such as instructions run on a processing device), firmware, or a combination thereof. For example, a server (e.g., the server 160 in FIG. 1B) having a processor to execute instructions retrieved from the server's memory may perform at least part of the process described below.

In one embodiment, processing logic receives an updated master document having a change from a prior version of the master document (processing block 310). The prior version of the master document has been processed to generate a set of output documents. Details of some embodiments of the generation of the output documents have been discussed above. Processing logic parses the master document to identify parts of the master document affected by the change (processing block 312). For instance, the master document may be written in XML, which provides tags to identify various parts of the document (e.g., chapters, sections, figures, etc.). Processing logic may compare the updated master document with the prior version to determine the difference between the two versions, which are the change in the updated master document. Then processing logic may use the tags in the master document to identify which parts of the master document are affected by the change.

In some embodiments, processing logic applies stylesheets to the affected parts of the master document to generate the corresponding parts in the output documents (processing block 314). Then processing logic updates the output documents with the corresponding parts generated (processing block 316). For example, the change in the updated master document is a correction of a typographical error in chapter three of the master document, and thus, the change affects only chapter three of the master document. Then processing logic applies the stylesheets to chapter three of the master document to generate chapter three in the output formats supported (e.g., HTML, PDF, etc.) and then replaces the existing chapter three in each of the output documents with the newly generated chapter three in the corresponding output format.

Finally, processing logic publishes the updated output documents (processing block 318). For example, one of the updated output documents in HTML format may be published over a network (e.g., the Internet), another one of the updated output documents in PDF format may be published in print, etc.

Exemplary Processing Device

Figure 4:
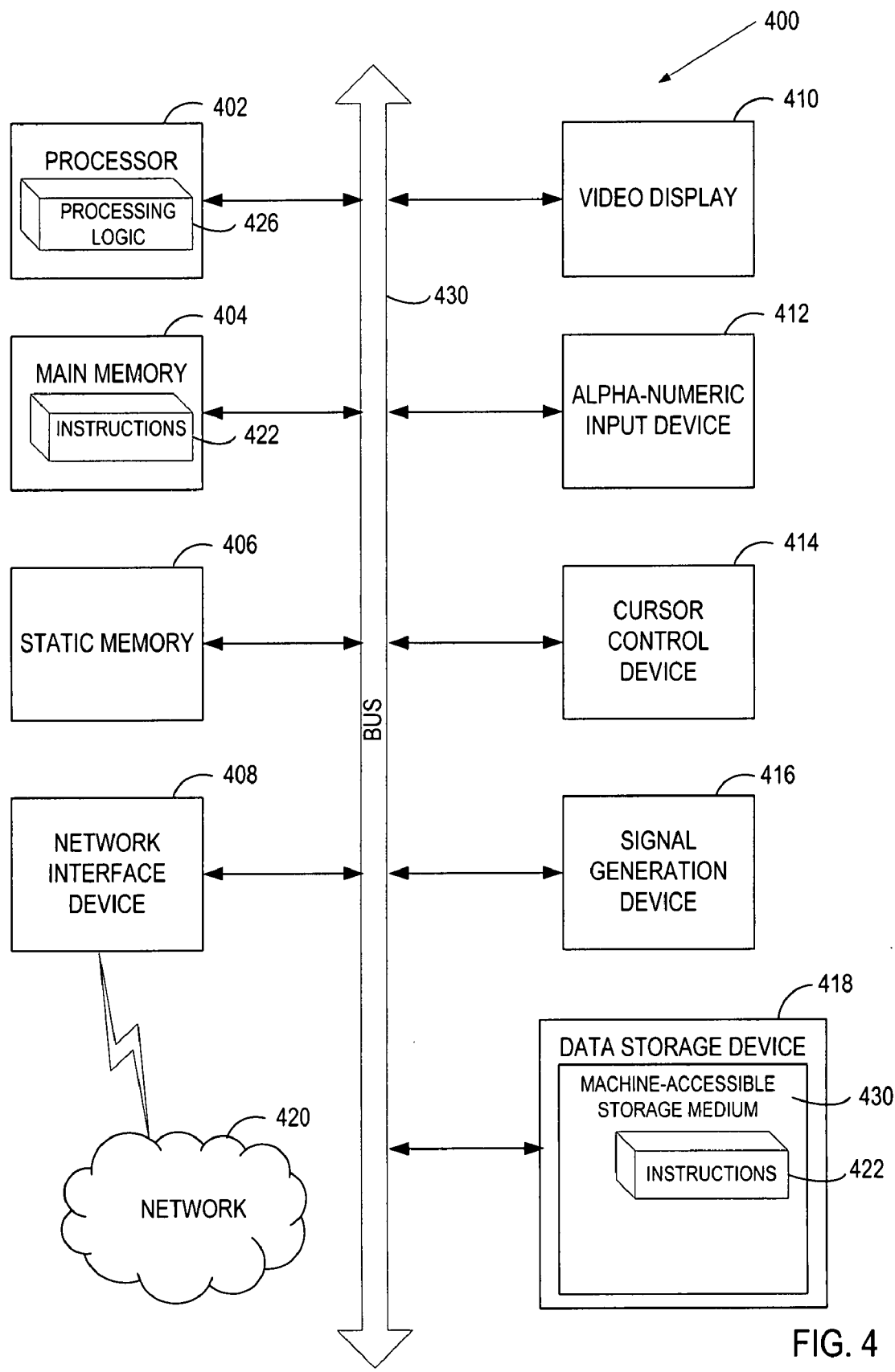
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In some alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a PC, a tablet PC, a set-top box (STB), a PDA, a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a publishing tool to syndicate documents in increments have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   generating, by a computing device, a plurality of output documents in a plurality of distinct formats from a master document; and
   maintaining, by the computing device, the plurality of output documents, said maintaining comprising:
      receiving an updated master document that includes one or more changes to the master document, wherein each part of the updated master document affected by one of the one or more of changes is identified by a tag of a markup language of the updated master document;
      identifying the parts of the updated master document affected by the one of the one or more changes by locating the tag associated with each part affected by the one of the one or more changes;
      generating, for each of the plurality of output documents, updated parts of the output document corresponding to each part of the updated master document identified by the tag, wherein the generating further comprises applying a plurality of stylesheets to each part of the updated master document identified by the tag to generate the updated parts of the output document, and
      updating parts of each of the plurality of output documents with the corresponding updated parts of the output document generated, without updating the entirety of each of the plurality of output documents.

2. The method of claim 1, further comprising:
   providing version control to each of the plurality of output documents and the master document by storing updates made to the master document and the plurality of documents in a repository.

3. The method of claim 1, further comprising:
   publishing one of the plurality of output documents via a networked user assistance system.

4. The method of claim 1, further comprising:
   publishing one of the plurality of output documents over a network.

5. The method of claim 1, further comprising:
   sending one of the plurality of output documents to a printing facility to print hardcopies of the one of the plurality of output documents.

6. The method of claim 1, further comprising changing the master document in response to a request received at a server from a client machine communicatively coupled to the server via a network.

7. The method of claim 1, further comprising changing the master document in response to a request received from a user via a user interface being executed on a computing machine.

8. An apparatus comprising:
   a memory to store instructions;
   a processing device, coupled to the memory;
   a user interface, executed from the memory by the processing device to receive a request to update a master document, wherein a plurality of output documents in a plurality of distinct formats have been generated from the master document; and
   a document publishing tool, executed from the memory by the processing device to:
      update the master document in response to the request, wherein each part of the updated master document affected by one of one or more changes is identified by a tag of a markup language of the updated master document;
      identify the parts of the updated master document affected by the one of the one or more changes by locating the tag associated with each part affected by the one of the one more changes;
      generate for each of the plurality of output documents, updated parts of the output document corresponding to each part of the updated master document identified by the tag, wherein the generating further comprises applying a plurality of stylesheets to each part of the updated master document identified by the tag to generate the updated parts of the output document, and
      update parts of each of the plurality of output documents with the corresponding updated parts of the output document generated, without regenerating an entirety of each of the plurality of output documents.

9. The apparatus of claim 8, wherein the publishing tool comprises:
   a parser to perform the parsing; and
   a document publishing module to perform the updating.

10. The apparatus of claim 9, further comprising:
    a repository, wherein the publishing tool comprises a version control module to store updates made to the master document and the plurality of output documents in the repository to track a version of each of the plurality of output documents and the master document.

11. A server comprising:
    a processing device;
    a network interface device to receive a request to update a master document from a network, wherein a plurality of output documents in a plurality of distinct formats have been generated from the master document, and
    a publishing tool coupled to the network interface device, the publishing tool configured to:
       update the master document in response to the request, wherein each part of the updated master document affected by one of one or more changes is identified by a tag of a markup language of the updated master document, identify the parts of the updated master document affected by the one of the one or more changes by locating the tag associated with each part affected by the one of the one or more changes;

generate for each of the plurality of output documents, updated parts of the output document corresponding to each part of the updated master document identified by the tag, wherein the generating further comprises applying a plurality of stylesheets to each part of the updated master document identified by the tag to generate the updated parts of the output document, and update parts of each part of the plurality of output documents with the corresponding updated parts of the output document generated, without regenerating an entirety of each of the plurality of output documents.

12. The server of claim 11, wherein the publishing tool further comprises:
a publishing module to publish one of the plurality of output documents over the network.

13. The server of claim 11, wherein the publishing tool comprises:
a parser to perform the parsing and update the corresponding updated part in each of the plurality of output documents.

14. The server of claim 11, further comprising:
a repository, wherein the publishing tool comprises a version control module to store updates made to the master document and the plurality of output documents in the repository to track a version of each of the plurality of output documents and the master document.

15. The server of claim 11, further comprising:
a client machine coupled to the server via the network, the client machine comprising
a user interface to receive a user request to update the master document, and a network access application to send the request to the server via the network in response to the user request.

16. A non-transitory machine-readable storage medium that provides instructions that, if executed by a processing device, will cause the processing device to perform operations comprising:
generating, by a computing device, a plurality of output documents in a plurality of distinct formats from a master document; and
maintaining, by the computing device, the plurality of output documents, said maintaining comprising:
receiving an updated master document that includes one or more changes to the master document, wherein each part of the updated master document affected by one of the one or more changes is identified by a tag of a markup language of the updated master document;
identifying the parts of the updated master document affected be the one of the one or more changes by locating the tag associated with each part affected by the one of the one or more changes;
generating, for each of the plurality of output documents, updated parts of the output document corresponding to each part of the updated master document identified by the tag, wherein the generating further comprises applying a plurality of stylesheets to each part of the updated master document identified by the tag to generate the updated parts of the output document, and
updating parts of each of the plurality of output documents with the corresponding updated parts of the output document generated, without updating the entirety of each of the plurality of output documents.

17. The non-transitory machine-readable storage medium of claim 16, wherein the operations further comprise:
providing version control to each of the plurality of output documents and the master document by storing updates made to the master document and the plurality of output documents in a repository.

18. The non-transitory machine-readable storage medium of claim 16, wherein the operations further comprise:
publishing one of the plurality of output documents via a networked user assistance system.

19. The non-transitory machine-readable storage medium of claim 16, wherein the operations further comprise:
publishing one of the plurality of output documents over a network.

20. The non-transitory machine-readable storage medium of claim 16, wherein the operations further comprise:
sending one of the plurality of output documents to a printing facility to print hardcopies of the one of the plurality of output documents.

21. The non-transitory machine-readable storage medium of claim 16, wherein the operations further comprise:
changing the master document in response to a request received at a server from a client machine communicatively coupled to the server via a network.

22. The non-transitory machine-readable storage medium of claim 16, wherein the operations further comprise:
changing the master document in response to a request received from a user via a user interface being executed on a computing machine.

* * * * *